P. CHRISTIANSEN.
SPLASH SCREEN FOR AUTOMOBILES AND THE LIKE.
APPLICATION FILED MAR. 24, 1915.

1,181,738. Patented May 2, 1916.

INVENTOR
PETER CHRISTIANSEN
BY *J. Van Dedemed*
ATTORNEY

UNITED STATES PATENT OFFICE.

PETER CHRISTIANSEN, OF COPENHAGEN, DENMARK.

SPLASH-SCREEN FOR AUTOMOBILES AND THE LIKE.

1,181,738.  Specification of Letters Patent.  Patented May 2, 1916.

Application filed March 24, 1915. Serial No. 16,591.

*To all whom it may concern:*

Be it known that I, PETER CHRISTIANSEN, a citizen of Denmark, and residing at Vesterbrogade 25, Copenhagen, Denmark, master smith, have invented new and useful Improvements in Splash-Screens for Automobiles and the like, of which the following is a specification.

This invention relates to splash-screens for automobiles or the like of the kind in which the support for the screen is mounted on a ball-bearing on a spigot formed integral with a cap which is fixed to the wheel axle or hub.

It has been proposed in automobiles to mount the support for the splash-screen on anti-friction rollers on the wheel cap, said support having three arms one of which was arranged vertically and connected through a rod and lever to a spring attached to top mudguard, the other two arms of the support being connected to the frame of the splash-screen.

In accordance with the present invention the bar or strip connecting the splash-screen support to the top mudguard has one end thereof located between a ring on the ball-bearing and a strap (7) connected to the screen.

The invention is illustrated in the accompanying drawings, wherein:—

Figure 1:
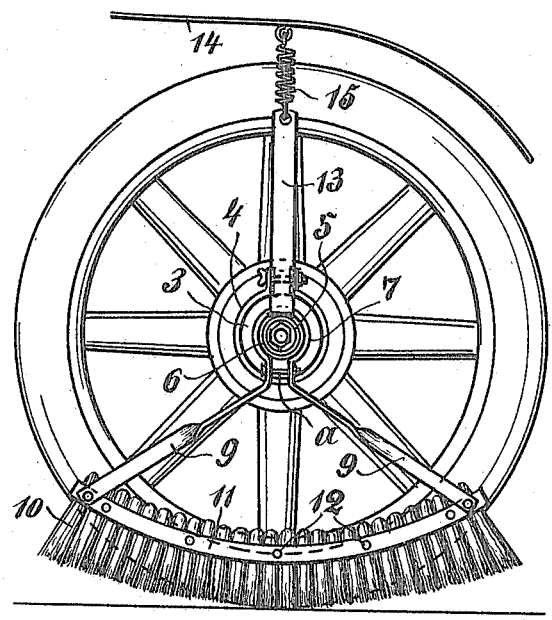
Figure 2:
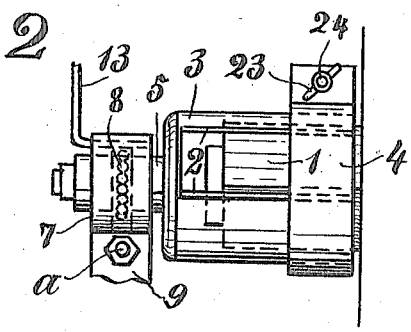

Figure 1 is a side view of the invention and Fig. 2 is a view at right angles to Fig. 1 showing the connection between the screen and the axle.

Referring to the drawings whereon the same reference numerals refer to the same or similar parts 5 is the spigot on which is the ball-bearing 8. On the said bearing is placed a ring 6 and between this ring and the strap 7 which supports the screen is located one end of a bar or strip 13. The other end of this strip is connected to the mudguard 14 by means of a spring 15. The spigot is integral with the cap 3 which is fashioned to conform to the nut-shape of the end of the axle 1. The cap may be locked in position on the axle by means of a split ring 4, and if desired may be placed on the hub of the wheel instead of on the axle. The ring 4 is secured in position by means of a bolt 24 and fly-nut 23 and can be easily detached. The strap 7 is provided with tie-rods 9 on which the splash-screen is mounted, and the sides of the strap 7 where they separate from the ring 6 are connected together by a bolt *a*.

The splash-screen comprises brushes 10 which are secured between two curved pieces 11. The pieces 11 are secured together by means of screw bolts 12 and the brushes can be easily fixed in position and detached when desired. An india-rubber screen or the like may be used instead of the brushes 10.

Owing to the screen being connected to the mudguard 14 by means of the strip 13 its movement will coincide substantially therewith when the automobile is turning.

I claim as my invention:—

1. In a splash-screen for vehicle wheels, the combination, with the wheel, splash-screen and mudguard, of a bearing co-axial with the wheel; a ring around said bearing; a strap around the ring and having downward extensions secured to the screen; and an upright bar having its lower end between said ring and strap and its upper end connected to the mudguard.

2. In a splash-screen for vehicle wheels, the combination, with the wheel, splash-screen and mudguard, of a cap; a split ring securing the cap co-axial to the wheel; a spigot on said cap; a bearing on said spigot; a ring around said bearing; a strap around the ring and having downward extensions secured to the screen; and an upright bar having its lower end between said ring and strap and its upper end connected to the mudguard.

3. In a splash-screen for vehicle wheels, the combination, with the wheel, splash-screen and mudguard, of a bearing co-axial with the wheel; a ring around said bearing; a strap around the ring and having downward extensions secured to the screen; an upright bar having its lower end between said ring and strap and its upper end connected to the mudguard and a spring interposed between said bar and mudguard.

In testimony whereof I affix my signature in presence of two witnesses.

PETER CHRISTIANSEN.

Witnesses:
 HANS PEDERSEN,
 AXEL PERMEN.

Copies of this patent may be obtained for five cents each, by addressing the "Commissioner of Patents, Washington, D. C."